ized, No. 2,618,658

UNITED STATES PATENT OFFICE 2,618,658

2,2-DIMETHYL-3-HYDROXYPROPYLAMINE AND PROCESS FOR ITS PREPARATION

John R. Caldwell, Kingsport, Tenn., assignor to Eastman Kodak Company, Rochester, N. Y., a corporation of New Jersey No Drawing. Application June 8, 1949, Serial No. 97,906

3 Claims. (Cl. 260—584)

This invention relates to 2,2-dimethyl-3-hydroxypropylamine and a process for its preparation.

Processes for the preparation of alkylamines by hydrogenating certain aliphatic aldehydes in the presence of ammonia are well known. Several variations of such processes have been described. However, alkylolamines having a primary hydroxy radical in omega position to the amine radical, viz. those having the formula:

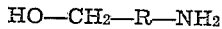

wherein R represents an alkylene radical, have not been produced by hydrogenating a hydroxyaldehyde, in the presence of ammonia. In fact, when a hydroxyaldehyde, such as 3-hydroxybutyraldehyde is hydrogenated in the presence of ammonia, water splits out, so that the end-product is n-butylamine rather than a hydroxybutylamine.

I have now found that hydroxy aldehydes, such as 2,2-dimethyl-3-hydroxypropionaldehyde (hydroxypivalic aldehyde), can be hydrogenated in the presence of ammonia to give hydroxy-alkylamines. In my new process some decomposition of the hydroxyaldehyde to give low-boiling products does take place and some secondary amine is also formed. However, the yields obtained in my process are high, since I have found that the process gives principally a hydroxyalkyl primary amine.

It is accordingly an object of my invention to provide 2,2-dimethyl-3-hydroxypropylamine. A further object is to provide an efficacious process for preparing the same. Other objects will become apparent hereinafter.

In accordance with my invention, I prepare 2,2-dimethyl-3-hydroxypropylamine by hydrogenating a mixture of 2,2-dimethyl-3-hydroxypropionaldehyde and ammonia. Advantageously, I employ from about 2 to about 4 moles of ammonia per mole of the aldehyde. From 2 to 3 moles is the most advantageous range.

It is advantageous to use a solvent as a medium in which to conduct the hydrogenation. Methyl alcohol, ethyl alcohol and isopropyl ether are typical solvents which can be employed.

The mixture of aldehyde and ammonia is hydrogenated under pressure. Advantageously, I utilize pressures in the range of from about 1,000 to about 2,000 pounds per square inch of hydrogen. Temperatures which I find most advantageous range from about 50° to about 100° C.; a range of from 90° to 100° C. is most advantageous. Catalysts which I employ with advantage include, in general, any type of active nickel catalysts. Specific types are nickel on silica gel, nickel on kieselguhr, and Raney nickel, as described on pages 14–20 of the book, "Reactions of Hydrogen" by H. B. Adkins, University of Wisconsin Press, 1937. Advantageously I utilize from about 5 to about 20% by weight of the aldehyde, of these catalysts. The most advantageous range is from 10 to 15%.

A rocking autoclave can be used to carry out the hydrogenation. The hydrogenation is usually complete in from about 3 to about 4 hours. The desired product can then be separated by filtering out the catalyst and distilling at a reduced pressure. By careful fractionation, yields of approximately 70 to 80% of 2,2-dimethyl-3-hydroxypropylamine are obtained.

The following example serves to illustrate further the manner of practicing my invention:

One hundred grams (approx. one mole) of 2,2-dimethyl-3-hydroxypropionaldehyde was dissolved in 200 cc. of ethyl alcohol and 40 to 50 grams of ammonia gas (approx. 2⅓ to 3 moles) was passed into the solution which was cooled to prevent an excessive rise in temperature. The catalyst employed was catalytic nickel of the type designated as Raney nickel; 10 grams were introduced into the solution. The entire mixture was then placed in a rocking autoclave. Hydrogen was introduced and maintained at a pressure of 1,500 pounds per square inch. The mixture was agitated under this pressure at a temperature of 90° to 100° C. for 3 to 4 hours. The resulting product was then filtered to remove the catalyst and distilled at reduced pressure. A yield of 75 to 80 grams of crude 2,2-dimethyl-3-hydroxypropylamine was obtained which boiled at 95°–105° C./35 mm. of Hg pressure. This amine titrated to give an equivalent weight of 110 to 113, the theoretical weight being 103. By careful fractionation a product boiling at 105° C./35 mm. of Hg pressure was obtained. This material was a solid under ordinary conditions. It melted at 98°–100° C. and titrated to give an equivalent weight of 103–104. The yield was 70 to 80%. Subsequently, the 2,4-dinitrobenzoic acid ester amide was prepared by reacting 2,4-dinitrobenzoyl chloride with the 2,2-dimethyl-3-hydroxypropylamine. It was found to have a melting point of 132° C.

The purity of the 2,2-dimethyl-3-hydroxypropionaldehyde that is employed is not critical. It may be prepared by any known method, e. g. as described in J. Am. Chem. Soc. 62, 1785 (1940).

The 2,2-dimethyl-3-hydroxypropylamine produced by my invention can be used as a chemical intermediate, e. g. as an ingredient in the manufacture of linear polyester amides. The product of my invention is particularly useful in the manufacture of cellulose acetate dyes.

What I claim as my invention and desire to be secured by Letters Patent of the United States is:

1. 2,2 - dimethyl-3-hydroxypropylamine which can be represented by the following formula:

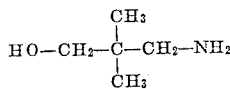

2. A process for preparing 2,2-dimethyl-3-hydroxypropylamine which comprises hydrogenating a mixture of 2,2-dimethyl-3-hydroxy propionaldehyde and ammonia, in a solvent selected from the group consisting of methyl alcohol, ethyl alcohol, and isopropyl ether, at a pressure of from 1,000 to 2,000 pounds per square inch and at a temperature of from 50° to 100° C., and in the presence of a Raney nickel hydrogenation catalyst, the molar ratio of the aldehyde to the ammonia being from 1:2 to 1:4.

3. A process for preparing 2,2-dimethyl-3-hydroxypropylamine which comprises hydrogenating a mixture of 2,2-dimethyl-3-hydroxypropionaldehyde and ammonia, in ethyl alcohol, at a pressure of 1,500 pounds per square inch and at a temperature of from 90° to 100° C., for from 3 to 4 hours, in the presence of from 10% to 15% by weight of the aldehyde, of a Raney nickel hydrogenation catalyst, the molar ratio of the aldehyde to the ammonia being from 1:2 to 1:4.

JOHN R. CALDWELL.

REFERENCES CITED

The following references are of record in the file of this patent:

UNITED STATES PATENTS

| Number | Name | Date |
|---|---|---|
| 1,889,678 | Mannich | Nov. 29, 1932 |
| 2,252,713 | Goldberg et al. | Aug. 19, 1941 |
| 2,367,366 | Olin et al. | Jan. 16, 1945 |
| 2,477,842 | Wenner | Aug. 2, 1949 |
| 2,477,943 | Robinson et al. | Aug. 2, 1949 |

FOREIGN PATENTS

| Number | Country | Date |
|---|---|---|
| 539,104 | Germany | May 8, 1939 |
| 598,984 | Great Britain | Mar. 2, 1948 |